(12) United States Patent
Ganguly et al.

(10) Patent No.: US 11,950,304 B2
(45) Date of Patent: Apr. 2, 2024

(54) DIRECT SERVER-TO-SERVER WIRELESS DATA CENTER NETWORK AND METHOD THEREOF

(71) Applicants: Amlan Ganguly, West Henrietta, NY (US); Minseok Kwon, Pittsford, NY (US); Andres Kwasinski, Fairport, NY (US); Sayed Ashraf Mamun, Rochester, NY (US); Sree Gowrishankar Umamaheswaran, Mishawaka, IN (US)

(72) Inventors: Amlan Ganguly, West Henrietta, NY (US); Minseok Kwon, Pittsford, NY (US); Andres Kwasinski, Fairport, NY (US); Sayed Ashraf Mamun, Rochester, NY (US); Sree Gowrishankar Umamaheswaran, Mishawaka, IN (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 16/388,007

(22) Filed: Apr. 18, 2019

(65) Prior Publication Data
US 2019/0327780 A1    Oct. 24, 2019

Related U.S. Application Data

(60) Provisional application No. 62/659,267, filed on Apr. 18, 2018.

(51) Int. Cl.
*H04W 76/15*    (2018.01)
*H04B 10/114*   (2013.01)
(Continued)

(52) U.S. Cl.
CPC .......... *H04W 76/15* (2018.02); *H04B 10/114* (2013.01); *H04L 49/40* (2013.01);
(Continued)

(58) Field of Classification Search
None
See application file for complete search history.

(56) References Cited

U.S. PATENT DOCUMENTS 6,498,939 B1 * 12/2002 Thomas ............... H04B 7/0695
455/562.1
7,643,468 B1    1/2010  Arregoces et al.
(Continued)

OTHER PUBLICATIONS

Baccour, E., Foufou, S., Hamila R. and Hamdi, M., (2015). A survey of wireless data center networks, Information Sciences and Systems (CISS), 49th Annual Conference on, Baltimore, MD, pp. 1-6, ("Baccour et al.", hereinafter) (Year: 2015).*
(Continued)

*Primary Examiner* — Khaled M Kassim
*Assistant Examiner* — Berhanu D Belete
(74) *Attorney, Agent, or Firm* — Bond, Schoeneck & King PLLC; Joseph M. Noto

(57) ABSTRACT

A wireless server-to-server datacenter network architecture uses wireless links to eliminate the need for power-hungry switching fabric of traditional fat-tree based datacenter networks. The server-to-server wireless datacenter network (S2S-WiDCN) requires Line-of-Sight (LoS) between servers to establish direct communication links. Utilizing this LoS links, a horizontal-first routing algorithm is developed which, will establish fast communication links between any pair of communicating servers in the data center. The wireless links can be realized in millimeter-wave (such as 30, 60, 120 GHz) or THz (such as 300 GHz) frequency bands. The use of antenna-arrays to create beam-steering towards communicating servers is necessary to establish the
(Continued)

direct server-to-server links. In the presence of an obstruction such as an IT technician, the LoS between communicating servers may be blocked. To address this issue, an obstruction-aware adaptive routing algorithm for the S2S-WiDCN is proposed. Alternatively, the wireless links can be realized with FSO. The performance of such a wireless data center is better than that of conventional tree-based wired data centers while its power consumption is significantly lower than that of the conventional data center network.

18 Claims, 9 Drawing Sheets

(51) Int. Cl.
| | | |
|---|---|---|
| H04L 49/40 | (2022.01) | |
| H04L 67/12 | (2022.01) | |
| H04W 4/33 | (2018.01) | |
| H04W 4/80 | (2018.01) | |
| H04W 16/28 | (2009.01) | |
| H04W 40/20 | (2009.01) | |
| H04W 40/24 | (2009.01) | |
| H04W 52/02 | (2009.01) | |
| H04W 76/14 | (2018.01) | |

(52) U.S. Cl.
CPC .............. *H04L 67/12* (2013.01); *H04W 4/33* (2018.02); *H04W 4/80* (2018.02); *H04W 16/28* (2013.01); *H04W 40/20* (2013.01); *H04W 40/248* (2013.01); *H04W 52/02* (2013.01); *H04W 76/14* (2018.02)

(56) References Cited

U.S. PATENT DOCUMENTS

| | | | | |
|---|---|---|---|---|
| 8,483,569 | B2* | 7/2013 | Davidson | H04B 10/1149 398/127 |
| 8,873,426 | B2 | 10/2014 | Ramachandran et al. | |
| 8,972,601 | B2 | 3/2015 | Padhye et al. | |
| 9,184,845 | B1* | 11/2015 | Vahdat | H04Q 11/0071 |
| 9,391,716 | B2 | 7/2016 | Shin et al. | |
| 9,496,592 | B2* | 11/2016 | Adiletta | H04B 1/40 |
| 9,768,501 | B2* | 9/2017 | Maltsev | H01Q 3/00 |
| 9,807,727 | B2 | 10/2017 | Shetty et al. | |
| 9,854,594 | B2* | 12/2017 | Sanduleanu | H04W 16/28 |
| 9,999,064 | B2* | 6/2018 | Sanduleanu | H04B 7/086 |
| 10,020,880 | B2 | 7/2018 | Gupta et al. | |
| 10,110,504 | B2 | 10/2018 | Shin et al. | |
| 10,111,199 | B2 | 10/2018 | Larson et al. | |
| 10,142,934 | B2 | 11/2018 | Mizutani | |
| 10,231,279 | B2 | 3/2019 | Nakano et al. | |
| 10,602,532 | B2* | 3/2020 | Sanduleanu | H04L 49/101 |
| 10,708,930 | B2* | 7/2020 | Sanduleanu | H04L 47/50 |
| 10,813,106 | B2* | 10/2020 | Sanduleanu | H04L 49/101 |
| 11,096,190 | B2* | 8/2021 | Sanduleanu | H04W 72/12 |
| 11,456,523 | B2* | 9/2022 | Liu | H01L 23/481 |
| 2005/0050272 | A1* | 3/2005 | Behrens | G06F 1/18 711/114 |
| 2007/0097659 | A1* | 5/2007 | Behrens | G06F 1/18 361/788 |
| 2008/0030947 | A1* | 2/2008 | Behrens | G06F 1/189 361/730 |
| 2010/0172292 | A1* | 7/2010 | Ramachandran | H04W 84/10 370/328 |
| 2011/0087799 | A1* | 4/2011 | Padhye | H05K 7/1498 398/43 |
| 2011/0090942 | A1* | 4/2011 | Hardacker | H04W 16/28 709/224 |
| 2011/0241833 | A1* | 10/2011 | Martin | H04L 41/50 707/705 |
| 2013/0287397 | A1* | 10/2013 | Frankel | H04J 14/0213 385/16 |
| 2014/0292582 | A1 | 10/2014 | Ware | |
| 2014/0351406 | A1* | 11/2014 | Martin | H04L 41/50 709/223 |
| 2015/0080039 | A1* | 3/2015 | Ling | H04B 7/24 455/500 |
| 2015/0125112 | A1* | 5/2015 | Frankel | G02B 6/35 385/16 |
| 2015/0281064 | A1* | 10/2015 | Sanduleanu | H04L 49/101 370/310 |
| 2016/0142864 | A1* | 5/2016 | Leigh | G06K 19/0776 455/41.2 |
| 2016/0173199 | A1* | 6/2016 | Gupta | H04L 41/0803 398/127 |
| 2016/0270099 | A1* | 9/2016 | Sanduleanu | H04B 7/086 |
| 2016/0360637 | A1* | 12/2016 | Harvilchuck | F16L 3/26 |
| 2017/0006410 | A1* | 1/2017 | Barrett | H04W 4/023 |
| 2017/0006576 | A1* | 1/2017 | Barrett | H04W 64/003 |
| 2017/0027087 | A1* | 1/2017 | Meyer | H05K 7/20745 |
| 2017/0086182 | A1* | 3/2017 | Petrick | H04B 7/0408 |
| 2017/0099190 | A1* | 4/2017 | Pitwon | H04L 41/12 |
| 2017/0126054 | A1* | 5/2017 | White | H02J 9/061 |
| 2017/0222863 | A1* | 8/2017 | Franca-Neto | H01Q 1/52 |
| 2017/0247108 | A1* | 8/2017 | Ljubuncic | G06V 20/17 |
| 2017/0353966 | A1* | 12/2017 | Sanduleanu | H04L 49/254 |
| 2018/0049212 | A1* | 2/2018 | Sanduleanu | H04W 16/28 |
| 2018/0116074 | A1* | 4/2018 | Meyer | H05K 7/20836 |
| 2018/0213545 | A1* | 7/2018 | Sanduleanu | H04B 7/086 |
| 2018/0370628 | A1* | 12/2018 | Ljubuncic | G06V 10/44 |
| 2018/0376624 | A1* | 12/2018 | Magcale | F24T 10/30 |
| 2019/0044841 | A1* | 2/2019 | Lairsey | H05K 7/1498 |
| 2019/0098793 | A1* | 3/2019 | Gridish | H04B 7/24 |
| 2019/0182179 | A1* | 6/2019 | Pak | H04L 49/10 |
| 2020/0154455 | A1* | 5/2020 | Sanduleanu | H04L 47/50 |
| 2020/0252349 | A1* | 8/2020 | Pak | H04L 49/10 |

OTHER PUBLICATIONS

Zhang, W., Zhou, X., Yang, L., Zhang, Z., Zhao, B. Y. and Zheng, H., (2011). "3d beamforming for wireless data centers," in Proceedings of the 10th ACM Workshop on Hot Topics in Networks, ser. HotNets-X. ACM, pp. 4:1-4:6, ("Zhang et al. (2011)", hereinafter). (Year: 2011).*

Umamaheswaran, S.G., (2017). ("Umamaheswaran", hereinafter). A Power Efficient Server-to-Server Wireless Data Center Network Architecture Using 60 GHz Links. Rochester Institute of Technology, 1-64. (Year: 2017).*

Leiserson, "Fat-trees: universal networks for hardware-efficient supercomputing." In IEEE Transactions on Computers 100.10, 1985, 892-901.

Guo et al. "BCube: A high performance, server-centric network architecture for modular data centers," in Proceedings of the ACM SIGCOMM, vol. 39, Issue 4, 2009, pp. 63-74.

Guo et al. "DCell: A scalable and fault-tolerant network structure for data centers," in ACM SIGCOMM Computer Communication Review, vol. 38, No. 4, 2008, pp. 75-86.

Farrington et al. "Helios: A hybrid electronic/optical switch architecture for modular data centers," in Proceedings of the ACM SIGCOMM, vol. 40, Issue 4, Oct. 2010, pp. 339-350.

Zhou et al. "Mirror mirror on the ceiling: flexible wireless links for data centers," in Proceedings of ACM SIGCOMM Computer Communication Review, Helsinki, Finland, 42(4), Sep. 2012, pp. 443-454.

Katayama et al. "Wireless data center networking with steered-beam mmWave links," in 2011 IEEE Wireless Communications and Networking Conference, Cancun, 2011, pp. 2179-2184.

Halperin et al. "Augmenting data center networks with multi-gigabit wireless links," ACM SIGCOMM Computer Communication Review, vol. 41, No. 4, 2011, p. 38.

Vardhan et al. "60GHz wireless links in data center networks", in Computer Networks, vol. 58, 2014.

* cited by examiner

| Default Routing Mechanism: Horizontal-First Routing |
|---|
| 1: if source and destination servers are in same rack |
| 2:     *communication is done in 1 hop in vertical plane* |
| 3:   else if source and destination servers are in same vertical plane but different rack |
| 4:     *communication is done in 1 hop in vertical plane* |
| 5:     else if *servers* are in *different row* but *same column* and *same height* |
| 6:       *communication is done in 1 hop in horizontal line* |
| 7:       else if *servers* are in *different row* and *different column* |
| 8:         select the server in *destination plane* at *same height* and *same column* as of source server as the *intermediate node* then |
| 9:         *route* the flow in *2 hop* using Horizontal First *routing* |
| 10:         end if |
| 11:       end if |
| 12:     end if |
| 13: end if |

FIG. 4

| Adaptive Routing: Obstruction-Avoidance Routing |
|---|

```
 1: if Obstruction detected in the Horizontal line ← false
 2:     Default Horizontal-First Routing
 3: else
 4:     if servers are in different row and same column
 5:         choose a random server in source plane in a different rack
            as 1st intermediate node then
 6:         select the corresponding server in destination plane (same
            height and same column as of 1st intermediate node) as the
            2nd intermediate node then
 7:         if Obstruction detected in the Horizontal line ← true
 8:             go to: 5
 9:         else
10:             route the flow in 3 hop using Vertical-First routing
11:         end if
12:     end if
13:     if servers are in different row and different column
14:         choose the server in the source plane situated in the same
            height and same column of the destination server as
            intermediate node then
15:         if Obstruction detected in the Horizontal line ← true
16:             go to: 14
17:         else
18:             route the flow in 2 hop using Vertical-First Routing
18:         end if
20:     end if
21: end if
```

DIRECT SERVER-TO-SERVER WIRELESS
DATA CENTER NETWORK AND METHOD
THEREOF

CROSS REFERENCE

This application claims the benefit of the filing date of U.S. Provisional Patent Application Ser. No. 62/659,267, filed Apr. 18, 2018, which is hereby incorporated by reference in its entirety.

This invention was made with government support under grant number CNS-1553264 awarded by United States National Science Foundation. The government has certain rights in this invention.

FIELD

The present invention relates to direct server-to-server wireless data center network, and particularly direct server-to-server millimeter-wave wireless data center network with obstruction-aware routing and method thereof.

BACKGROUND

Traditionally the servers in a datacenter network (DCN) are connected with cables/wires following tree-like hierarchical structure by using switches and routers. The power consumption of the switches and routers in DCN is very high. The power consumption of these switches is not scalable with activity, meaning that power consumption does not reduce much if the load is very low.

Alternate solutions using server-centric DCN architectures have been proposed such as BCube and DCell using a recursive topology. Although this architecture can reduce the power consumption, the amount of the reduction is not that significant. Solutions have been proposed previously to utilize 60 GHz wireless links to handle the communication between the top-of-rack switches in DCN. But in this architecture, the power consumption is still high due to the existence of the power-hungry top-of-the-rack switches. One notable solution like the Microsoft Cayley Data center used direct sever to server link but the arrangement of the servers are in a cylindrical bin to enable line of sight (LoS) between the servers on the backside. Another design has proposed a polygonal layout to enable the LoS between the backsides of the servers. This makes the adoption of the architecture difficult as traditionally servers in a datacenter are arranged in a rectangular arrangement. Moreover, none of these solutions proposed an obstruction-avoidance routing.

SUMMARY

In accordance with an aspect of the current disclosure, a server-to-server wireless datacenter network, includes a plurality of adjacent rows of server racks with aisles running between the plurality of adjacent rows, each one of the adjacent rows including a plurality of adjacent server racks having each server disposed in a vertical plane, each server rack including a vertical stack of a plurality of servers, wherein each server is horizontally aligned with a corresponding server in an adjacent row, in a three-dimensional space; and wireless links established along horizontal lines and vertical planes of the plurality of servers, the wireless links including a directional transmitter and directional receiver attached on a top of each of the plurality of servers enabling communication in the horizontal direction and a directional transmitter and directional receiver attached on a side of each of the plurality of servers enabling communication between servers disposed in the vertical plane; wherein the communication between any pair of servers can be established in the three-dimensional space.

In accordance with another aspect of the current disclosure, a method for data routing in a datacenter network, includes establishing wireless links along horizontal lines through a directional transmitter and directional receiver attached on a top of each of a plurality of servers in a plurality of server racks, by orienting the directional receiver towards the directional transmitter by exchange of control messages; and establishing wireless links along vertical planes through a directional transmitter and directional receiver attached on a side of each of the plurality of servers in the plurality of server racks, by orienting the directional receiver towards the directional transmitter by exchange of control messages; wherein communication between any pair of servers can be established.

BRIEF DESCRIPTION OF THE DRAWINGS

FIG. 4 is a pseudocode for horizontal-first routing in accordance with an embodiment of the present invention;

FIG. 6 is a pseudocode for obstruction-avoidance routing in accordance with an embodiment of the present invention.

DETAILED DESCRIPTION

Figure 1:
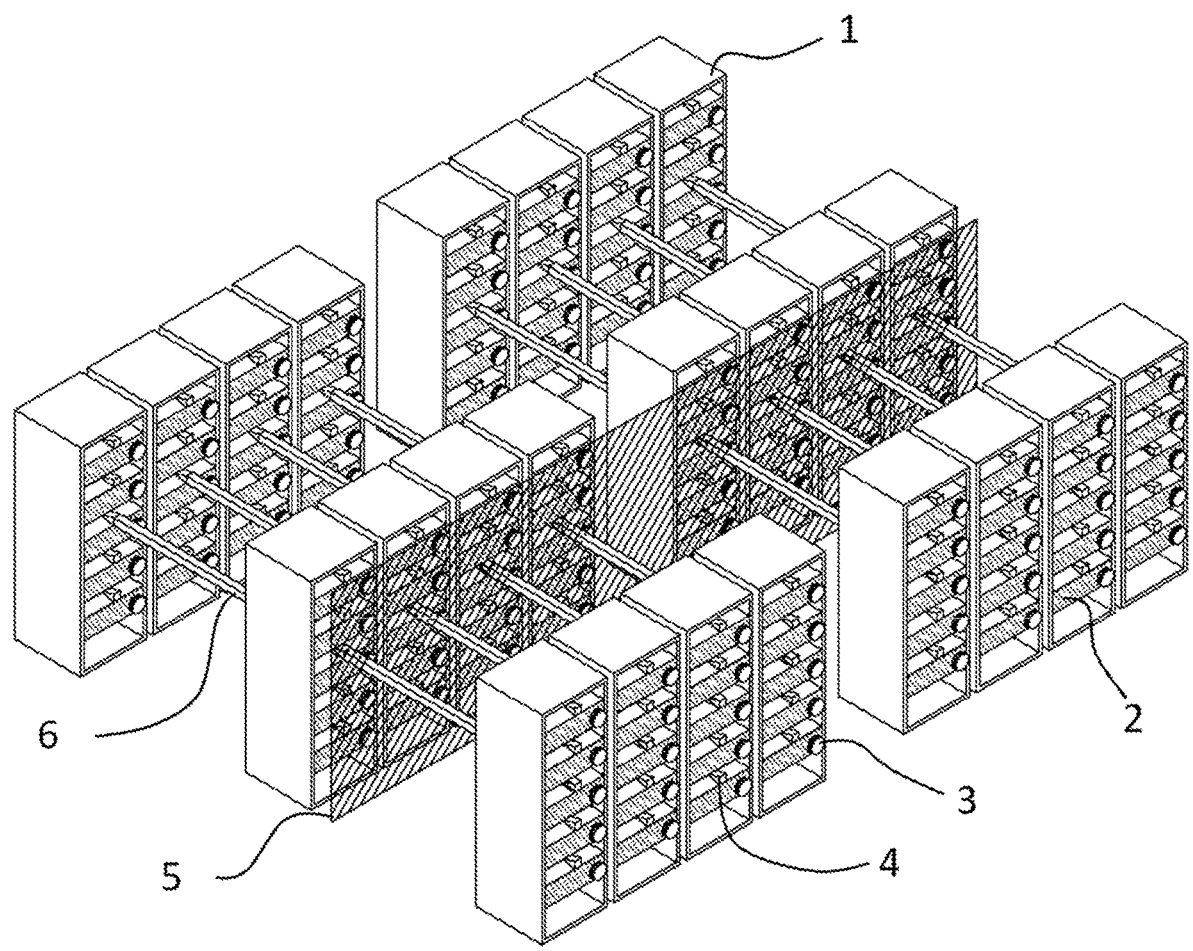
FIG. 1 is a schematic of a horizontal line communication server-to-server wireless datacenter network in accordance with an embodiment of the present invention.

In Server-to-Server Wireless Datacenter Network (S2S-WiDCN) architecture, millimeter-wave (mm-wave or mmWave) wireless links, such as 60 GHz links, can be used between the individual servers. Through direct server-to-server wireless links using directional antenna arrays, power hungry switching fabric of traditional DCNs are eliminated, resulting in significant power savings in data transfer. The antenna arrays should be capable of performing electronic beam steering. The communication between servers in the wireless DCN is achieved along horizontal lines and vertical planes as shown in FIG. 1.

Figure 2:
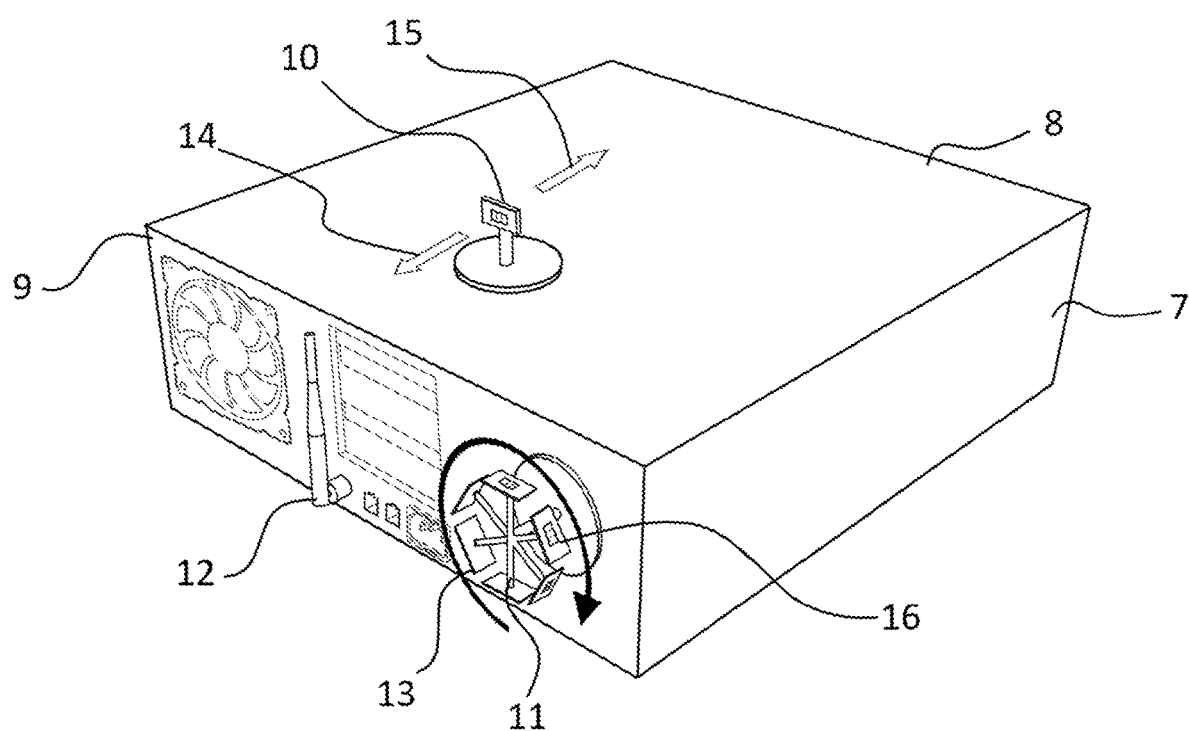
FIG. 2 is a schematic of a server having two antenna arrays/transmitters and receivers in accordance with an embodiment of the present invention.

In the S2S-WiDCN, the datacenter racks are laid out in a traditional rectangular pattern adjacent to one another with aisles running between rectangular rows of racks. In order to avoid obstruction to wireless communication links, wireless links are established along the horizontal lines and vertical planes to communicate between any two servers in the three-dimensional space. To achieve this, in an embodiment each server is equipped with two high gain antenna arrays. One antenna-array is attached to the top of the server to enable the communication in the horizontal direction, and another one at the side, preferably the back side, of the server projecting out from the rack to enable communication in the vertical plane, as shown in FIG. 2. To avoid interference and obstructions from the rack frames, communication in the horizontal plane is in a single line between horizontally-aligned servers. In an embodiment, optical wireless links are established along the horizontal lines and vertical planes by use of appropriately placed transmitters and receivers. In accordance with embodiments of the present disclosure, a top of the server refers to any portion of the server where wireless links can be located that establish horizontal line connection between horizontally disposed servers in adjacent rows and a side or back of the server refers to any portion of the server where wireless links can be located that establish connection between servers disposed in a vertical plane.

Using the beam-steering capability of the antenna array, LoS links between communicating servers can be established with the help of a control interface. Each server is assigned a unique ID according to its geometric location to help determine the beam-steering angles that are precomputed depending on the location.

All the metallic surfaces and walls of the datacenter are preferably coated with anti-reflecting material cover to minimize the multipath propagation of the signal. Such anti-reflection materials with low reflection coefficients are easily available, and only add an additional layer to the building infrastructure without a significant change in the building design.

Server-to-server communication in the datacenter can be broadly classified into two types, i.e., inter-rack and intra-rack communications based on the location of the source and destination. All the intra-rack communications are completed in one hop in the vertical plane, whereas inter-rack communication depends on the relative position of the source and destination. An adaptive routing protocol for the S2S-WiDCN, is capable of routing traffic flows even in the presence of obstruction of the LoS between two servers due to reasons such as presence of human beings along the datacenter aisles. First, the default routing mechanism followed by the proposed method to make the default routing adaptive for robustness against obstruction of LoS.

Figure 3A:
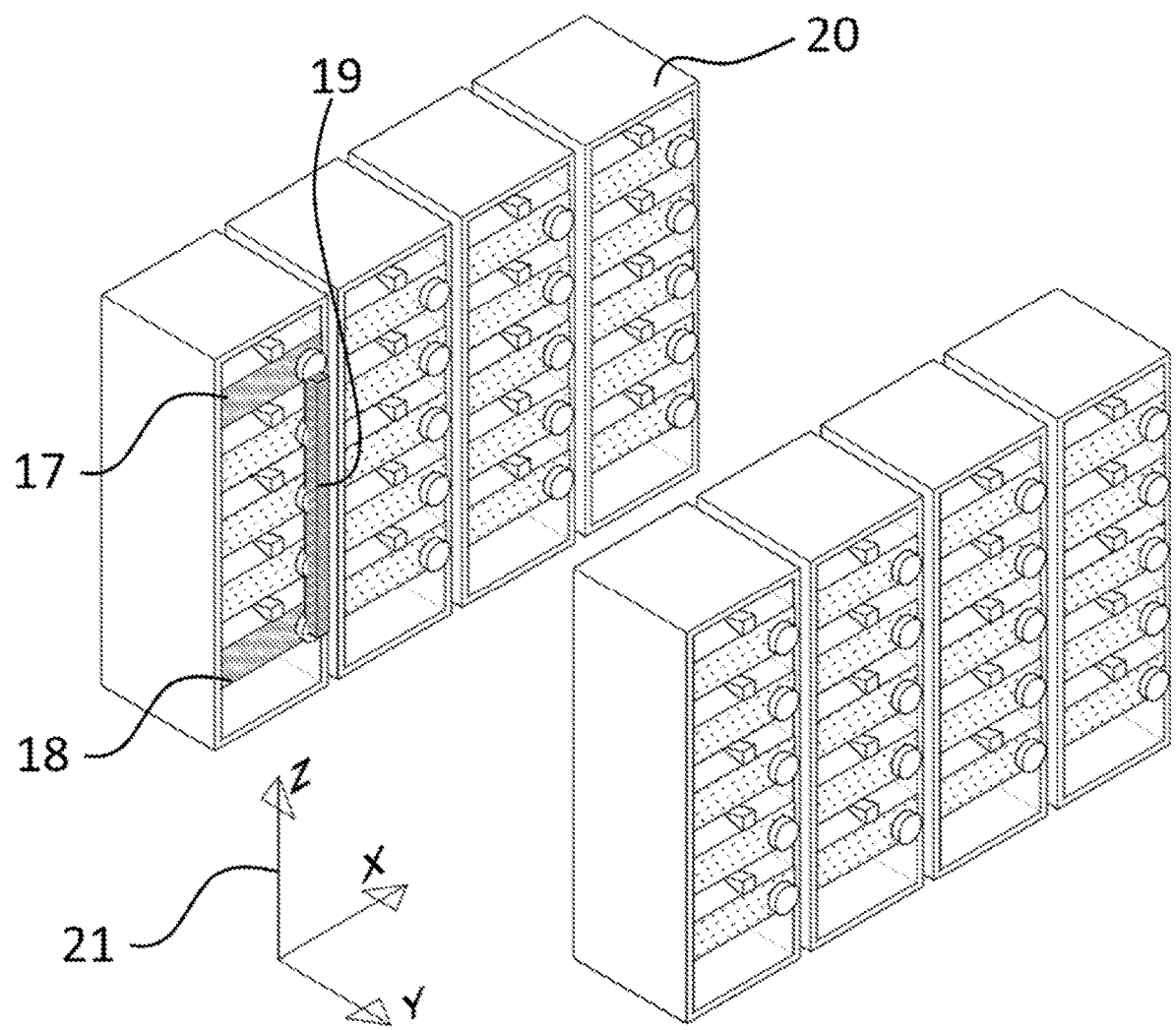
FIG. 3A is a schematic of vertical plane communication between servers arranged in a 3D Cartesian coordinate system in accordance with an embodiment of the present invention.
Figure 3B:
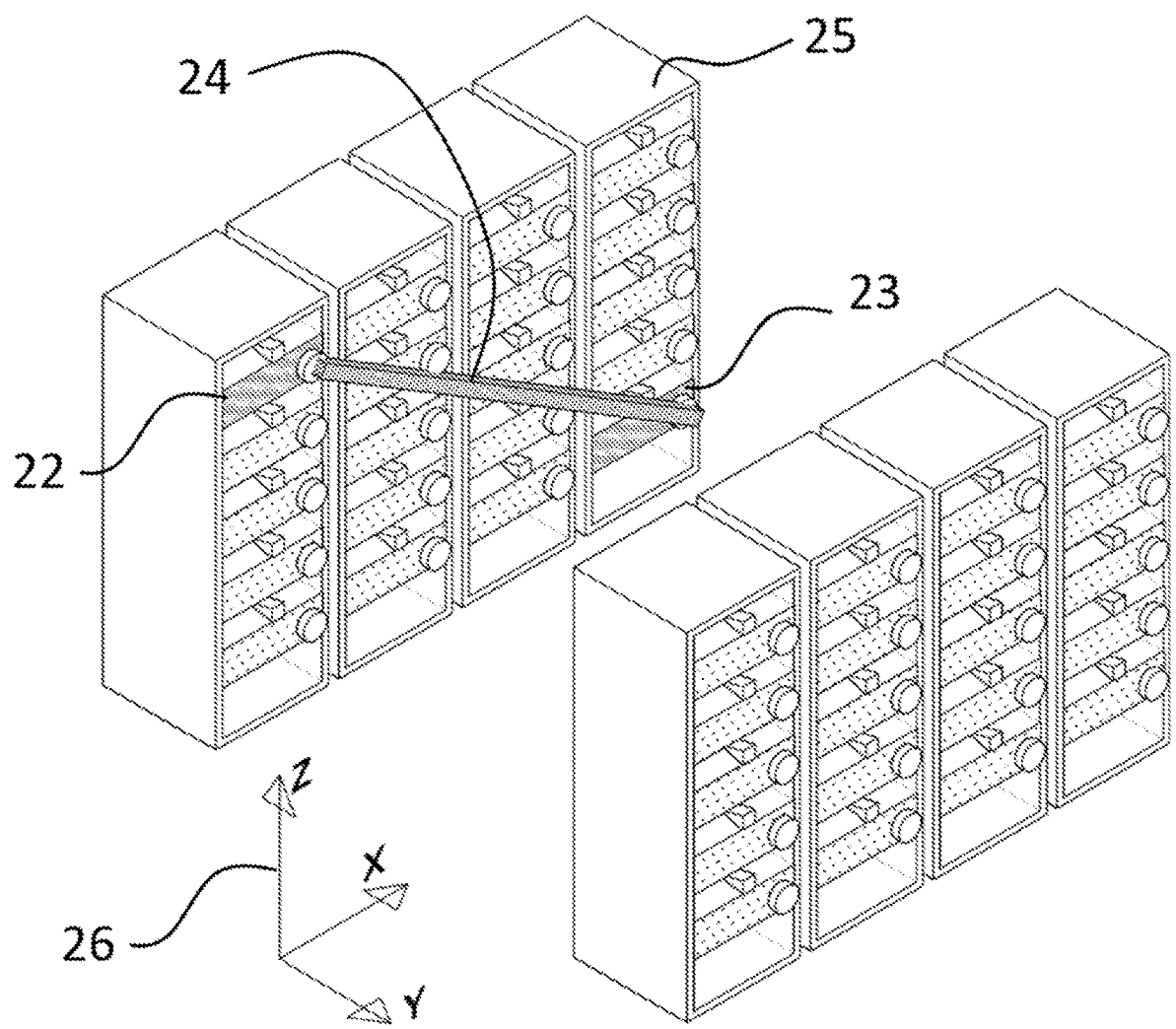
FIG. 3B is a schematic of vertical plane communication between servers arranged in a 3D Cartesian coordinate system in accordance with an embodiment of the present invention.

Default Horizontal-First Routing: For the default routing mechanism, a Horizontal-First routing is described in this subsection. The server arrangement plays an important role in the design of this routing protocol. For the purpose of the Horizontal-First routing algorithm the servers are considered to be arranged in a 3D Cartesian coordinate system with each server having a unique 3D coordinate as shown in FIG. 3. Server-to-server communication in a datacenter can be broadly classified into two types, i.e., inter-rack and intra-rack communication based on the location of the source and destination servers. All the intra-rack communications are completed in one hop in the vertical plane as shown in FIG. 3A whereas inter-rack communication depends on the relative position of the source and destination servers. There are three possible scenarios for inter-rack communication:

Both the source and destination servers are located in the same vertical plane (the same row or the same Y coordinate) as shown in FIG. 3B. In this case a direct single hop link will be established between the source and destination for data transfer. In an embodiment, intra-rack communication between servers can be wired.

Figure 3C:
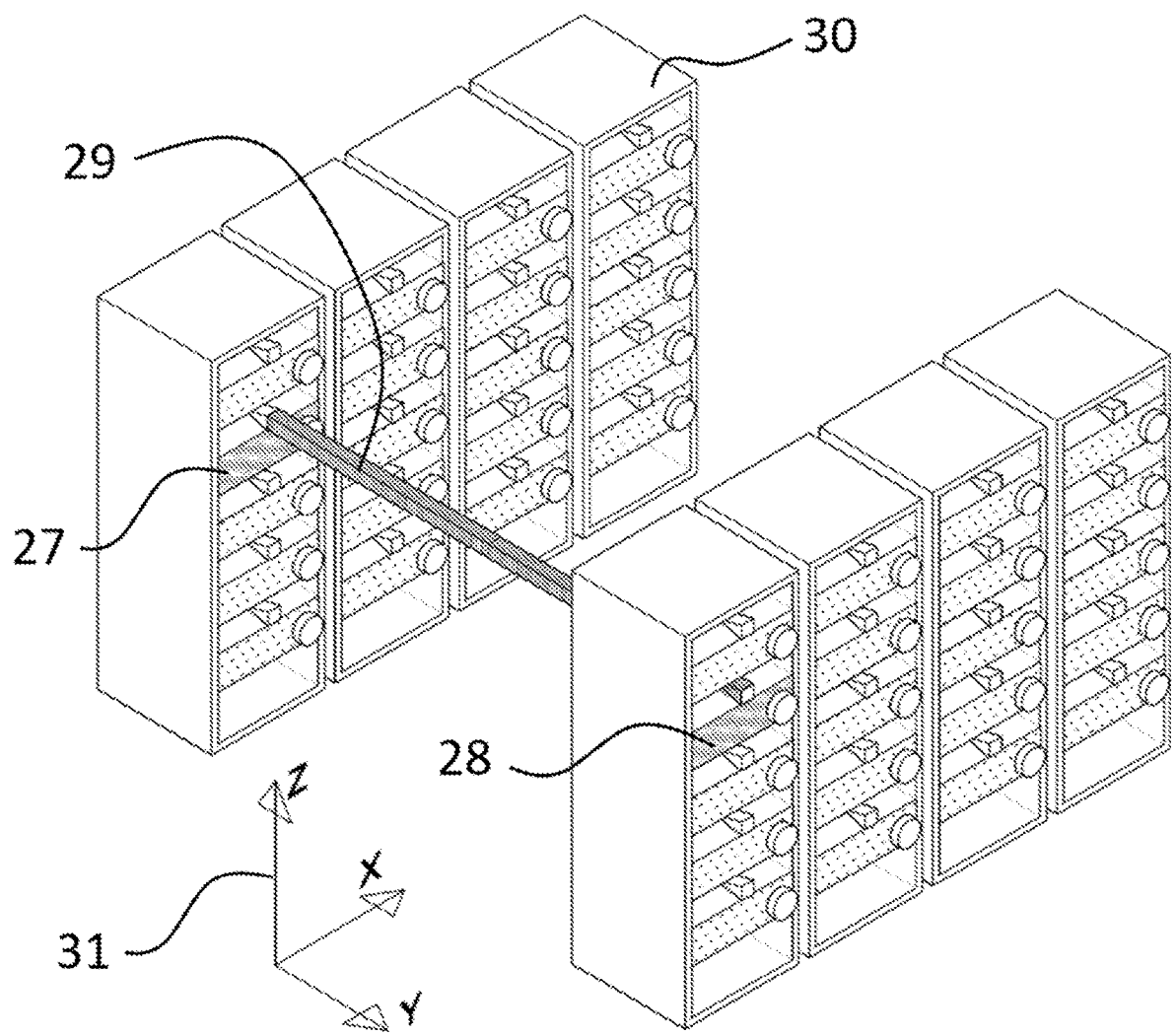
FIG. 3C is a schematic of horizontal line communication between servers arranged in a 3D Cartesian coordinate system in accordance with an embodiment of the present invention.

Both the source and destination servers are in the same column with same height above the ground (the same X and the same Z coordinates but different Y coordinates). In this case a single hop direct link along a horizontal line will be established between the source and destination for communication as shown in FIG. 3C.

Figure 3D:
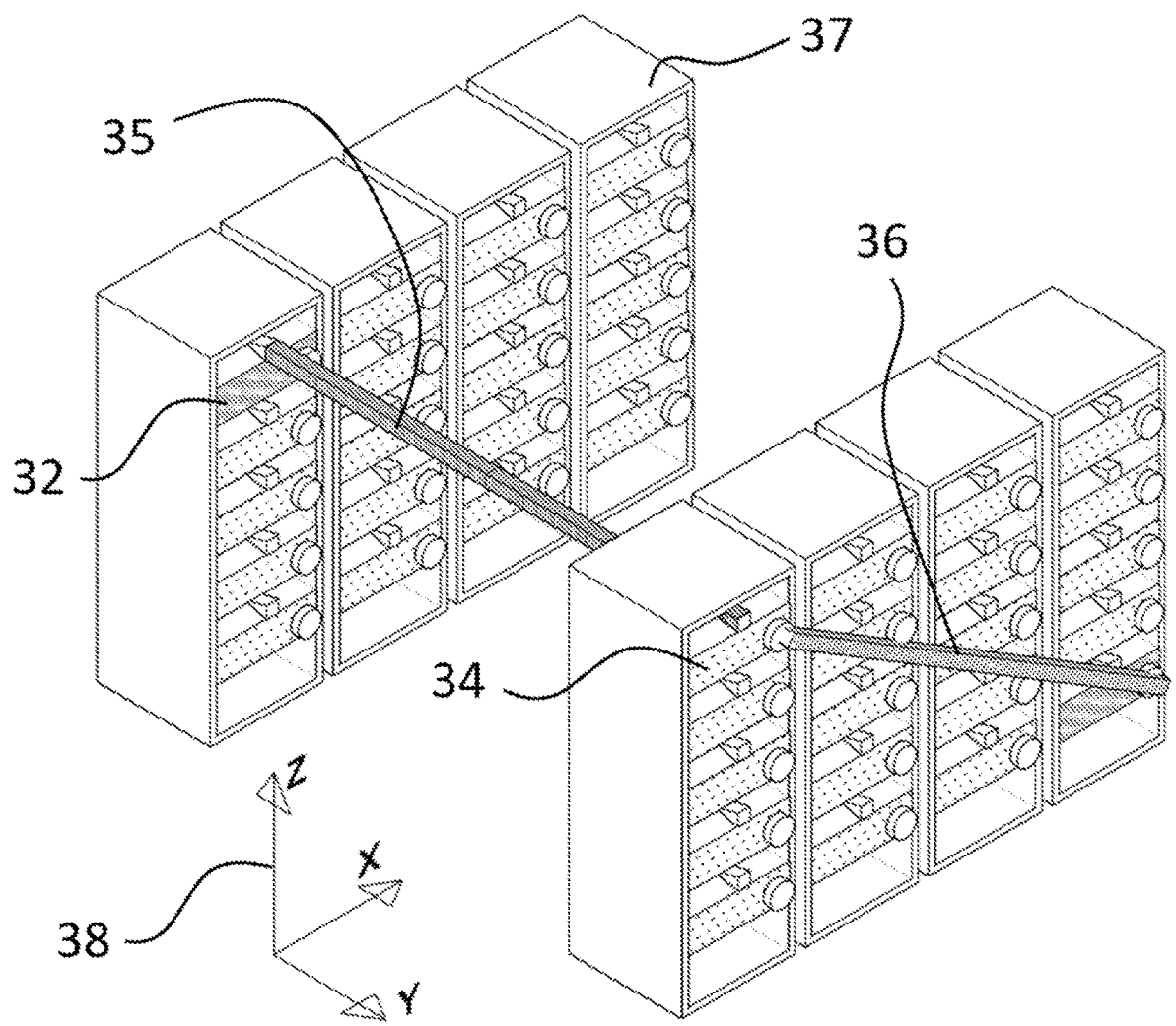
FIG. 3D is a schematic of a 2-hop communication link between servers arranged in a 3D Cartesian coordinate system in accordance with an embodiment of the present invention.

The source and destination servers are in different row and column (different X and Y coordinates, may or may not have the same Z coordinate). In this case a 2-hop link will be established for communication using an intermediate server as shown in FIG. 3D. The intermediate server is the one that is in the same column and height from the source server, but in the row of the final destination (the same X and Z coordinates as that of the source and the same Y coordinate as the destination). As the data travels along the horizontal line first, a preferred routing protocol is referred to as Horizontal-First routing. In the proposed topology, every server is capable of working as a potential intermediate node. A pseudocode for the Horizontal-First routing is shown in FIG. 4.

Control information in the form of a control packet with instructions for intermediate and destination servers to steer their antennas in the correct directions is sent over a separate IEEE 802.11 2.4/5 GHz ISM band. Each server is equipped with an IEEE 802.11 2.4/5 GHz transceiver. As the radiation pattern has main lobes in both forward and backward directions, steering is not required for the horizontal linear communication a shown in FIG. 2. For communications in the vertical planes, the server, which is ready to send data, first sends a control packet to the receiving server while simultaneously steering its antenna array towards the receiver. Upon receipt of this control message, wireless module at the receiver chooses the antenna array in the correct sector out of the set of 6 and steers that array towards the sending server by activating the correct phase differences (paths connecting the elements). The IEEE 802.11 2.4/5 GHz ISM band is also used for sending the acknowledgments to enable the Carrier-sense multiple access (CSMA)-based MAC for the 60 GHz links using the IEEE802.11ad protocols. In order to provide access to the Internet with necessary bandwidth, gateway functionalities can be hosted at multiple server locations within the rectangular arrangement in the wireless DCN. These gateways will therefore be connected directly or indirectly, to all the servers and will preferably run firewall and security functionalities as per the requirement of the datacenter.

Figure 5:
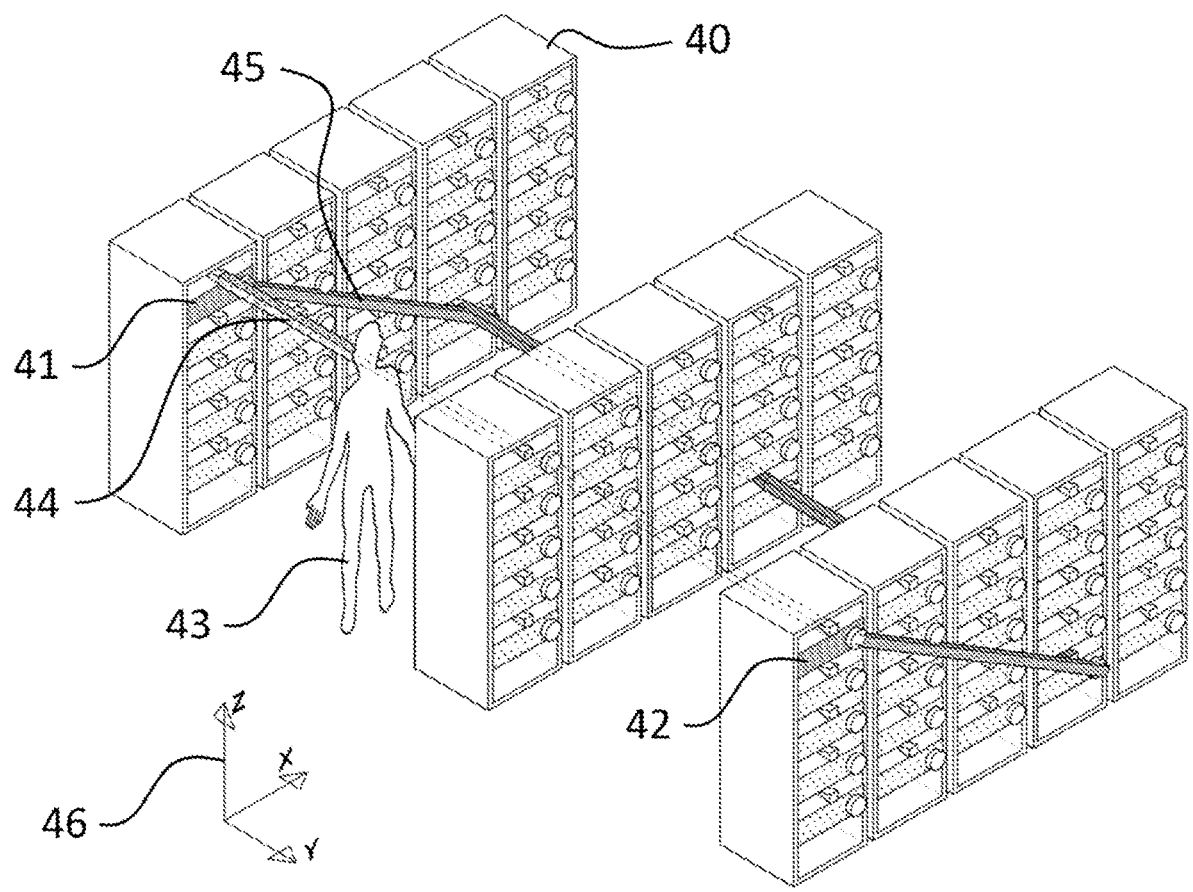
FIG. 5 is a schematic of obstruction-avoidance routing in accordance with an embodiment of the present invention.

Obstruction-Avoidance Routing: In some scenarios, the LoS necessary for the Horizontal-First routing can be obstructed. For example, when a human technician or any other obstacle is in front of an aisle it can potentially obstruct the horizontal server-to-server LoS communication between all servers in the aligned racks. This will not only affect servers of the rows directly adjacent to the human obstruction but also servers in racks of all rows that use those horizontal paths for inter-row communication as shown in FIG. 5. An Obstruction-Avoidance adaptive routing mechanism addresses this failure model and successfully routes traffic flows in presence of such obstructions between specific racks. In the adaptive routing, all servers start sending packets following the default Horizontal-First routing strategy outlined earlier. The CSMA acknowledgment mechanism is utilized to detect a failed transmission after several trials according to the IEEE 802.11ad MAC.

In this adaptive routing strategy, after detecting a failed transmission the sender determines the route of the next transmission attempt. If the destination server is in another rack in the same row, the sender retransmits the flow using the default Horizontal-First routing algorithm. This is because the failed transmission did not happen because of the horizontal LoS obstruction from the technician as that LoS link was not used in the first transmission attempt. The transmission happens over the back vertical plane, which is not obstructed by the failure model under consideration. If the destination is in another row, instead of adopting the Horizontal-First approach, a Vertical-First routing approach is adopted where, a server in the same row but a different rack is chosen at random and the path is established to that server using the back vertical plane. A pseudocode for the Horizontal-First routing is shown in FIG. 6. Control packets are sent over the IEEE802.11 2.4/5 GHz ISM control plane to establish the links using beam-steering. From that other server, again the default Horizontal-First routing is adopted to reach the final destination. If the randomly chosen intermediate server for Obstruction-Avoidance routing is also obstructed by another technician, the Obstruction-Avoidance routing approach can be repeated again till the Horizontal-First routing is successful to transfer packets to the destination row. In this way, this adaptive routing mechanism can be extended to an obstruction model with multiple technicians obstructing multiple racks in the datacenter. The performance of the S2S-WiDCN in presence of such an obstruction will be degraded for the obstructed flows.

The separation between the horizontal communicating lines and the rows coupled with the directional radiation pattern of the antennas ensures that the horizontal lines and vertical planes of wireless communication are spatially isolated meaning that communications in one plane do not interfere with those in the next.

In one possible embodiment of this data center network architecture the wireless links will be in the 60 GHz millimeter-wave (mmWave) band. Other embodiments can have other frequencies of the wireless links, such as 30 GHz, 120 GHz or other mmWave, THz or even Free-Space Optical (FSO) links.

A major use of this invention is in design of wireless datacenter networks. Such a design reduces the power consumption of data center networks by up to 87%. Data centers are the backbone of the digital world. Social media, scientific research and e-commerce transactions use data centers. The global carbon footprint of data centers is around 2-3% and can be reduced significantly by using this novel wireless data center.

EXAMPLE 1

As an example of various wireless link technologies 60 GHz wireless transceivers and antenna arrays can be used. These arrays can electronically steer their beams within microseconds. Therefore, the link set up latency is fast and does not significantly affect performance of tasks.

FIGURE LEGEND

1 Rack
2 Server
3 Back antenna
4 Top antenna
5 Vertical communication plane
6 Horizontal wireless path
7 Server
8 Server top plane
9 Server back plane
10 Top antenna
11 Back antenna
12 ISM band antenna
13 Beam Directions of back antenna
14 Beam direction of top antenna
15 Beam direction of top antenna
16 Individual antenna array
17 Transmitting server
18 Destination server
19 Wireless link
20 Rack
21 Axis
22 Transmitting server
23 Destination server
24 Wireless link
25 Rack
26 Axis
27 Transmitting server
28 Destination server
29 Wireless link
30 Rack
31 Axis
32 Transmitting server
33 Destination server
34 Intermediate server
35 First hop of wireless link
36 Second hop of wireless link
37 Rack
38 Axis
39 Pseudocode for Horizontal-First routing protocol
40 Rack
41 Transmitting server
42 Destination server
43 Obstruction
44 Blocked LOS link due to obstruction
45 Alternate wireless route
46 Axis
47 Pseudocode for routing protocol if obstruction is detected Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A server-to-server wireless datacenter network, comprising:
a plurality of adjacent rows of server racks in a rectangular pattern with aisles running between the plurality of adjacent rows, each server rack comprising a vertical stack of a plurality of servers, each one of the adjacent rows comprising a plurality of adjacent server racks having each server therein disposed in a vertical plane of the row, wherein each server is horizontally aligned with a corresponding server in an adjacent row, in a three-dimensional space; and
wireless links established along horizontal lines and vertical planes of the plurality of servers, the wireless links comprising a beam-steering directional transmitter and beam-steering directional receiver attached on a top of each server of the plurality of servers configured to provide direct server-to-server wireless gigabit speed communication in the horizontal direction and a beam-steering directional transmitter and beam-steering directional receiver attached on a side of each server in the vertical plane of the row of the plurality of servers configured to provide direct server-to-server wireless gigabit speed communication between servers disposed in the vertical plane of the row; wherein direct server-to-server wireless gigabit speed communication between any pair of servers can be provided in the three-dimensional space.

2. The network of claim 1, further comprising line of sight obstruction-avoidance routing to obstructions between the aisles.

3. The network of claim 1, further comprising horizontal-first routing hosted in the plurality of servers.

4. The network of claim 1, further comprising wired communication between each server within a rack.

5. The network of claim 1, wherein the wireless link comprises an antenna-array.

6. The network of claim 5, wherein the antenna-array comprises a millimeter-wave band.

7. The network of claim 1, wherein the wireless link comprises an optical transmitter and receiver.

8. The network of claim 1, wherein the directional receiver is capable of orienting towards the directional transmitter by exchange of control messages.

9. The network of claim 1, wherein the wireless link can transmit and receive communication between a pair of servers in non-adjacent rows.

10. The network of claim 1, further comprising initially assigning each server of the plurality of servers a geometric coordinate position represented by a unique ID=(X,Y,Z), where X represents the number of the rack, Y represents the number of the aisle and Z represents a height of the server on the rack prior to establishing the direct server-to-server wireless links.

11. A method for data routing in a datacenter network, comprising:
    establishing direct server-to-server wireless links along horizontal lines through a beam-steering directional transmitter and beam-steering directional receiver attached on a top of each server of a plurality of servers in adjacent rows of a plurality of server racks in a rectangular pattern with aisles running between the plurality of adjacent rows, wherein each server is horizontally aligned with a corresponding server in an adjacent row, by orienting the top-attached beam-steering directional receiver towards the top-attached beam-steering directional transmitter by exchange of control messages; and
    establishing direct server-to-server wireless links within a row of the adjacent rows along a vertical plane of the row through a beam-steering directional transmitter and beam-steering directional receiver attached on a side of each server of the plurality of servers in the plurality of server racks, by orienting the side-attached beam-steering directional receiver towards the side-attached beam-steering directional transmitter by exchange of control messages; wherein direct server-to-server wireless gigabit speed communication between any pair of servers can be provided.

12. The method of claim 11, wherein data between communicating servers is first sent to a horizontally aligned server using the directional transmitter and directional receiver on the top of the server and then sent vertically to a final destination server using the directional transmitter and directional receiver on the side of the server according to horizontal-first routing.

13. The method of claim 11, further comprising avoiding line of sight obstructions in the path of data by:
    first traveling within a row of the source away from the obstruction and then routing to a horizontally aligned server in the row of the destination server; and
    finally routing from the horizontally aligned server the data to the final destination server along the vertical plane of the destination row.

14. The method of claim 11, further comprising wiring communication between each server within a server rack.

15. The method of claim 11, wherein the wireless link comprises an antenna-array.

16. The method of claim 15, wherein the antenna-array comprises a millimeter-wave band.

17. The method of claim 11, wherein the wireless link comprises an optical transmitter and receiver.

18. The method of claim 11, wherein the wireless link can transmit and receive communication between a pair of servers in non-adjacent rows.

* * * * *